United States Patent
Allbee et al.

(10) Patent No.: US 11,254,274 B1
(45) Date of Patent: Feb. 22, 2022

(54) VEHICLE IMPACT ENERGY MANAGEMENT STRUCTURES AND TECHNIQUES

(71) Applicant: Zoox, Inc., Foster City, CA (US)

(72) Inventors: Mark Christian Allbee, Sunnyvale, CA (US); Mark Alan Bates, Kenilworth (GB); Ramanjaneya Reddy Butukuri, Union City, CA (US); Kevin Hothem, Redwood City, CA (US); Marcos Puerta Terron, Cheltenham (GB); Vishveshwar Ramanathan Subramanian, Palo Alto, CA (US); Thomas Andrew Stoddart, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 35 days.

(21) Appl. No.: 16/731,451

(22) Filed: Dec. 31, 2019

(51) Int. Cl.
*B60R 21/02* (2006.01)
*B62D 21/09* (2006.01)
*B62D 21/15* (2006.01)
*B60K 1/04* (2019.01)

(52) U.S. Cl.
CPC .............. *B60R 21/02* (2013.01); *B62D 21/09* (2013.01); *B62D 21/152* (2013.01); *B60K 1/04* (2013.01); *B60R 2021/0266* (2013.01)

(58) Field of Classification Search
CPC ............ B60R 21/02; B60R 2021/0266; B62D 21/152; B62D 21/09; B60K 1/04
USPC ....................................................... 296/24.43
See application file for complete search history.

(56) References Cited

U.S. PATENT DOCUMENTS

| 3,893,703 | A | * | 7/1975 | Chika | B60R 21/02 |
| | | | | | 280/753 |
| 7,416,039 | B1 | * | 8/2008 | Anderson | B60K 6/30 |
| | | | | | 180/165 |
| 8,292,232 | B1 | * | 10/2012 | Andrews | B64G 1/62 |
| | | | | | 244/159.1 |
| 10,010,784 | B1 | * | 7/2018 | Doerksen | B62K 1/00 |
| 10,780,930 | B1 | | 9/2020 | Kentley-Klay et al. | |
| 10,858,044 | B2 | | 12/2020 | Sawatzki et al. | |
| 10,960,939 | B1 | | 3/2021 | Kentley-Klay et al. | |
| 2005/0275181 | A1 | * | 12/2005 | MacIsaac | B60G 3/01 |
| | | | | | 280/124.103 |
| 2009/0127812 | A1 | * | 5/2009 | Copsey | B60G 9/02 |
| | | | | | 280/124.128 |
| 2009/0242298 | A1 | | 10/2009 | Guss et al. | |
| 2013/0078496 | A1 | | 3/2013 | Lim et al. | |
| 2013/0248267 | A1 | | 9/2013 | Nitawaki | |
| 2017/0259811 | A1 | | 9/2017 | Coulter et al. | |
| 2018/0111501 | A1 | | 4/2018 | Takeuchi et al. | |
| 2018/0178641 | A1 | | 6/2018 | Yamafuji et al. | |

(Continued)

*Primary Examiner* — Pinel E Romain
(74) *Attorney, Agent, or Firm* — Lee & Hayes, P.C.

(57) ABSTRACT

An impact energy management system for a vehicle includes an impact energy absorbing structure to absorb energy from an impact with an external object, and an energy management structure to manage energy from an impact with an internal displaceable object (e.g., a motor or steering rack) with one or more protected objects (e.g., a passenger compartment or battery). The energy management structure may include one or more swingarms or other members configured to protect the protected object from impact by directing the displaceable object down and/or away from the protected object during a collision.

20 Claims, 11 Drawing Sheets

(56) References Cited

U.S. PATENT DOCUMENTS

| | | | |
|---|---|---|---|
| 2018/0345777 A1 | 12/2018 | Birnschein et al. | |
| 2019/0039760 A1* | 2/2019 | Beesley | B65B 43/54 |
| 2020/0031426 A1* | 1/2020 | Voss | B62K 19/02 |
| 2020/0055407 A1 | 2/2020 | Foley et al. | |
| 2020/0086730 A1 | 3/2020 | Hara | |
| 2020/0361536 A1 | 11/2020 | Swain | |
| 2021/0013470 A1 | 1/2021 | Goitsuka | |
| 2021/0101462 A1* | 4/2021 | Ito | A01D 69/02 |
| 2021/0107331 A1* | 4/2021 | Asakura | B60H 1/00207 |
| 2021/0139078 A1 | 5/2021 | Peru et al. | |
| 2021/0179179 A1 | 6/2021 | Butukuri et al. | |

\* cited by examiner

US 11,254,274 B1

VEHICLE IMPACT ENERGY MANAGEMENT STRUCTURES AND TECHNIQUES

BACKGROUND

Many vehicles in operation today are designed to provide protection to a passenger from an impact with an external object. To provide protection, many vehicles use primary crash protection systems, for example, bumpers and/or airbags. While crash protection technology is improving, compact, electric, bidirectional, and/or autonomous vehicles have unique components and configurations that, under certain conditions, conventional primary protection systems may be insufficient to provide protection to the vehicle, vehicle components, or passengers during a crash.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
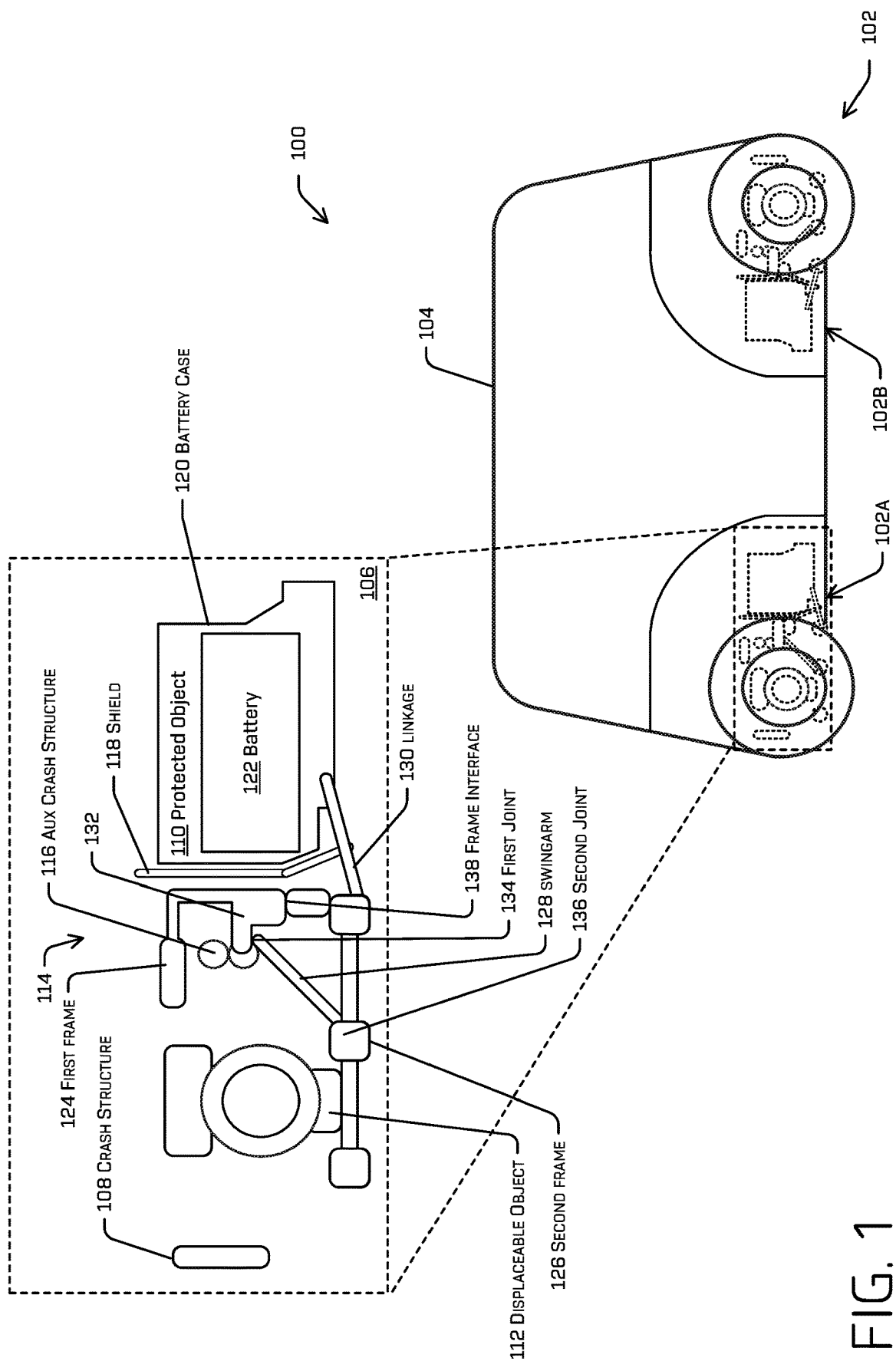
FIG. 1 is an illustration of an example vehicle having one or more drive assemblies configured with impact energy management structures to protect objects within the autonomous vehicle, in accordance with examples of the disclosure.

As discussed above, conventional primary crash protection systems may not be adequate to protect certain types of vehicles, and/or may provide insufficient protection for the vehicle, vehicle components, or passengers during a crash. For example, an electric vehicle may carry one or more large batteries that may be vulnerable to damage from other components or structures within the vehicle during a crash.

This application relates to structures and techniques for improving impact handling of vehicles, such as may be experienced during a crash. In order to mitigate damage sustained during a crash, in some examples, a vehicle may include an energy absorbing structure to absorb energy from impact with an external object and/or impact energy management structures to manage energy of a displaceable object within the vehicle to minimize or prevent damage to a protected object, such as a passenger compartment or battery.

For example, a vehicle may include an impact energy absorbing structure (e.g., bumper, crash rails, crumple zones, etc.) disposed at a distal end of the vehicle and configured to absorb energy from an impact with an external object. The vehicle may also include one or more protected objects internal to the vehicle. In some examples, the protected object may be a passenger compartment, a battery, a fuel cell, a fuel tank, a computing system, or other object susceptible to damage due to impact forces during a collision. The vehicle may also include a displaceable object disposed within an internal space of the vehicle between the first impact energy absorbing structure and the protected object. The displaceable object may be a relatively heavy, dense, and/or uncompressible object disposed in a space between the first energy absorbing structure and the protected object. By way of example and not limitation, the displaceable object may include an electric motor, a steering rack or other steering component(s), one or more suspension components, and/or a frame or support structure. During a collision, the displaceable object may be displaced toward the protected object. The impact energy management structure may be configured to protect the protected object from impact by the displaceable object during a collision. In some examples, the impact energy management structure may include one or more swingarms or other members to move the displaceable object away from the protected object and/or to change a direction of motion of the displaceable object to avoid or minimize impact of the displaceable object with the protected objection in the event of a collision. The vehicle may additionally or alternatively include one or more secondary impact energy absorbing structures disposed within the internal space of the vehicle between the protected object and the displaceable object to absorb energy of the displaceable object and/or deflect the displaceable object to provide further protection for the protected object. Additional details of secondary impact energy absorbing structures can be found in U.S. patent application Ser. No. 16/728,786, filed Dec. 27, 2019, which is incorporated herein by reference in its entirety.

In some examples, such as in the case of a bidirectional vehicle, the vehicle may include impact energy absorbing structures and impact energy management structures disposed at both longitudinal ends of the vehicle. In such examples, the vehicle may include a first drive assembly disposed at a first longitudinal end of the vehicle which includes first and second impact energy management structures, and a second drive assembly disposed at a second longitudinal end of the vehicle which includes third and fourth impact energy management structures.

In some examples, a drive assembly for a vehicle (e.g., bidirectional or unidirectional vehicle) may include an impact energy absorbing structure disposed at a distal end of the drive assembly and configured to absorb energy from an impact with an external object. The drive assembly may also include a protected object internal to the drive assembly. The drive assembly may also include a displaceable object disposed within an internal space of the drive assembly between the first impact energy absorbing structure and the protected object. The displaceable object may be displaced towards the protected object during a crash. The drive assembly may also include an impact energy management structure disposed within the internal space of the drive assembly between the protected object and the displaceable object. In the event that the displaceable object is displaced toward the protected object during a collision, the impact energy management structure is configured to move the displaceable object away from the protected object and/or to change a direction of motion of the displaceable object. In some examples, the impact energy management structure may additionally or alternatively be configured to absorb a portion of energy from the displaceable object, thereby protecting the protected object.

In some examples, a system may have a first and second frames coupled together by a first and second members (e.g., swingarms). In some examples, the first and second members may be coupled to the first and second frames at one or more joints, which may include hinges (e.g., living hinges), ball and socket joints, reaction surfaces, fasteners, or the like. For instance, a system may include a first frame and a second frame spaced from the first frame by a distance. A first member may have a first end coupled to the first frame at a first joint and a second end coupled to the second frame at a second joint. A second a second member may have a first end coupled to the first frame at a third joint and a second end coupled to the second frame at a fourth joint. In some examples, the first member and the second member are dimensioned such that, during a collision, the first member and the second member are configured to direct the second frame away from the first frame.

In some examples, the first joint includes a first frangible fastener connecting the first end of the first member to the first frame. In some examples, the third joint includes a second frangible fastener connecting the first end of the second member to the first frame. In some examples, the first frangible fastener and second frangible fastener are configured to break when subjected to a force exceeding a threshold force to disconnect the first member and the second member from the first frame during the collision. In some examples, the first member and the second member are configured to pivot about the first joint and the third joint, respectively, from a first position in which the first swingarm and the second swingarm are connected to the first frame by the first joint and the third joint, and a second position in which the first swingarm and the second swingarm are disconnected from the first frame and the first joint and the third joint function as reaction surfaces. In some examples, the first member includes a first living hinge proximate the second joint, and the second member includes a second living hinge proximate the fourth joint. In some examples, during a collision, the first and second living hinges promote a rotation about one or more of the first or second living hinges. In some examples, the configuration of the first and second joints may be switched. For example, the first joint may include a living hinge and the second joint may include a frangible fastener and reaction surfaces. This disclosure discusses certain structures and techniques to protect a passenger compartment, battery, and/or other protected objects from impact by one or more internal objects that may be displaced during a collision.

FIG. 1 is an illustration of an example vehicle 100 having one or more drive assemblies configured with impact energy management systems and structures to protect objects within the autonomous vehicle, in accordance with examples of the disclosure. The vehicle shown in FIG. 1 is a bidirectional autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle may be a fully or partially autonomous vehicle having any other level or classification. Moreover, in some instances, the energy management structures described herein may be applicable to non-autonomous and/or non-bidirectional vehicles as well. Also, while examples are given in which the vehicle is a land vehicle, the techniques described herein are also applicable to aerial, marine, and other vehicles.

In the illustrated example, the vehicle 100 includes a first drive assembly 102A and a second drive assembly 102B (collectively "drive assemblies 102") coupled to a body 104. Each of the drive assemblies 102 in this example includes multiple vehicle systems and may include systems or structures to protect those systems. For example, the first drive assembly 102A includes a protection system 106. The protection system 106 includes a crash structure 108, a protected object 110, a displaceable object 112, and an internal crash management system 114.

In some examples, the internal crash management system 114 includes an auxiliary crash structure 116, for example, a cross beam/cross member and a shield 118. In some examples, the shield 118 may be attached to a battery case 120 that may hold a battery 122. In some examples, the coupling of the shield 118 to the battery case 120 may provide additional structural support to the shield 118 thereby reducing the amount of shield material required to maintain a level of strength and/or stiffness. In some examples, the auxiliary crash structure 116 may be coupled to the battery case 120 and/or a first frame 124 or second frame 126 of the first drive assembly 102A.

In some examples, the internal crash management system 114 also includes a swingarm 128 and/or a linkage 130. In some examples, the swingarm 128 is coupled to the first frame 124 at a pocket 132 of a first joint 134. In some examples, the swingarm 128 is coupled to the second frame 126 at a second joint 136.

In some examples, the linkage 130 may be coupled to the second frame 126 at a first end of the linkage 130 and to the first frame 124 at a second end of the linkage 130. In some examples, the second end of the linkage 130 may be coupled to the first frame 124 directly or through various members and/or components of the drive assembly 102A. For example, the second end of linkage 130 may be coupled to the battery case 120 and the battery case 120 may be coupled to the first frame 124. While one swingarm 128 and one linkage 130 is shown in FIG. 1, in some examples, multiple swingarms and/or linkages may be used. For instance, in some examples, a pair of swingarms and a pair of linkages may be disposed in parallel, with one swingarm and one linkage on each lateral side of the internal crash management system 114.

In some examples, the first frame 124 may be coupled to the second frame 126. For example, the first frame 124 may be coupled to the second frame 126 at the frame interface 138. The frame interface 138 may include a frangible connection. For example, the frangible connection may include fasteners that may couple the frames together. In some examples, the frangible connection may be broken in certain conditions. For example, an impact with an external object may cause a loading of the frame interface 138 to exceed a threshold load that may cause the frangible connection to break.

Additionally or alternatively, the displaceable object 112 may be coupled to, for example, mounted on, the second frame 126. In some examples, the connection may be sufficient to cause the displaceable object 112 to move with the second frame 126.

The internal crash management system 114 may be configured to cause the displaceable object 112 to move away from the protected object 110, for example, in a direction that doesn't intersect with the protected object 110. In some examples, the movement may be sufficient to cause the displaceable object 112 to avoid impacting the protected object 110. For example and as will be discussed in more detail later, during an impact the second frame 126 may decouple from the first frame 124 at the frame interface 138. In some examples, the second frame 126 may be movably coupled to the first frame 124 through the swingarm 128 and/or linkage 130. In some examples, the second frame 126 may move relative to the first frame 124, and in examples where the swingarm 128 and the linkage 130 form pivot joints at the respective interfaces with the first frame 124 and second frame 126, the second frame 126 may swing in a direction away from the first frame 124. As better shown in FIGS. 3 and 5A, from a sideview, a system of the first frame 124, second frame 126, swingarm 128, and linkage 130 may be described as substantially a four-bar linkage which configures the second frame 126 to move away from the first frame along an arc for at least a portion of the movement to avoid or minimize impact of the second frame 126 and/or the displaceable object 112 with the protected object 110. For example, the second frame 126 may move away from the first frame 124 as the swingarm 128 pivots relative to the first joint 134 and the second joint 136 and the linkage 130 pivots relative to the first end and second end of the linkage 130. Additionally or alternatively, in examples where the displaceable object 112 is coupled to the second frame 126, the displaceable object 112 may move with the second frame 126 away from the protected object 110 (as better shown in FIG. 3).

In some examples, the crash structure 108 comprises an impact energy absorbing structure, for example, a bumper, that is configured to receive and absorb energy from an impact with an external object. The crash structure 108 may be configured to absorb energy from the impact, for example, by plastically deforming portions of the crash structure 108 and/or first frame 124. In these examples, the impact energy absorbing structure may include one or more crumple zones, deformation or bend intimating structures, or other energy absorbing structures.

In some examples, the protected object 110 may include the battery 122, a fuel cell, a fuel tank, or other energy storage system, a passenger compai iment, cabin, or cargo area of the vehicle, a computing system of the vehicle, or any other system of the vehicle that is to be protected and is susceptible to damage during a collision. In some examples, the protected object 110 may be enclosed within the battery case 120 or other protective housing. In some examples, the protected object 110 may be enclosed within the drive assembly 102A, while in other examples, the protected object 110 may be enclosed within the body 104 of the vehicle 100.

In some examples, the displaceable object 112, includes a motor, a drive system, a steering system, a control system, a hydraulic system, and/or a suspension system, a frame or structural component, or portions or combinations thereof.

In some examples, the displaceable object 112 may include any object within the drive assembly 102 that is likely to cause damage to the protected object 110 during an impact with an external object. In some examples, the displaceable object 112 may be an object that is relatively heavy, dense, and/or uncompressible/undeformable. In some examples, the displaceable object 112 may be propelled towards the protected object 110 by energy received from the impact. In some examples, the energy may be transferred to the displaceable object 112 directly, for example, if the external object directly impacts the displaceable object 112, or indirectly, for example, if the crash structure 108 transmits energy absorbed from the impact to the displaceable object 112, for example directly to or through the first frame 124 and/or second frame 126.

Additionally or alternatively, in some examples, one or both of the drive assemblies 102 may include cooling systems, a propulsion system of the vehicle, a steering system, a braking system, a suspension system, related controls and actuators for the forgoing systems, electronics related to supplying power from the one or more batteries to one or more other components or systems of the drive assemblies 102 and/or the body 104. In some examples, the drive assemblies 102 may also include exterior lighting, body panels, facia, and/or sensors.

In some examples, the first frame 124 and/or the second frame 126 may include a metal material (e.g., aluminum, steel, titanium, etc.), a plastic material (e.g., polymer, etc.), a composite material (e.g., fiberglass, carbon fiber, Kevlar, etc.), or a combination thereof. For example, the material may plastically deform to absorb energy.

In some examples, the swingarm 128 and/or linkage 130 may include a metal material (e.g., aluminum, steel, titanium, etc.), a plastic material (e.g., polymer, etc.), a composite material (e.g., fiberglass, carbon fiber, Kevlar, etc.), or a combination thereof. For example, the material may remain rigid in one or more directions, for example a longitudinal direction to cause the second frame to move relative to the first frame, and may plastically deform in other directions, for example, along an axis transverse to the longitudinal direction to create a hinge, for example a living hinge, to maintain a connection between the swingarm and/or linkage to the first frame and/or second frame.

In some examples, the frangible fasteners, for example, the fasteners connecting the first frame to the second frame and/or the swingarm to the first frame may include a metal material (e.g., aluminum, steel, titanium, etc.), a plastic material (e.g., polymer, etc.), a composite material (e.g., fiberglass, carbon fiber, Kevlar, etc.), or a combination thereof. For example, the material may remain rigid below a loading threshold to, for example, maintain a rigid connection, and may be configured to break (e.g., shear or otherwise fail) above the loading threshold to, for example, release the connection. In some examples, the frangible fasteners may have a lower strength than a strength of the swingarm 128 and/or the linkage 130.

In some examples, the battery 122 may be coupled to the battery case 120. The battery case 120 may include a metal material (e.g., aluminum, steel, titanium, etc.), a plastic material (e.g., polymer, etc.), a ceramic material, a composite material (e.g., fiberglass, carbon fiber, Kevlar, etc.), or a combination thereof. In at least one example, the battery case 120 may include a metal material, formed via an extrusion process. In some examples, the battery case 120 may be configured to envelope the battery 122 on all sides. As discussed above, the shield 118 may be attached to the battery case 120 on at least one side and may provide additional protection to the battery 122. In some examples, the shield 118 may be formed integrally with the battery case 120 (e.g., a wall of the battery case 120 may have a thicker wall thickness than other portions of the battery case 120). In some examples, the shield 118 and/or the battery case 120 may be made of a material that has a higher strength and/or rigidity than the auxiliary crash structure 116. In other words, in some examples, the auxiliary crash structure 116 has a first rigidity which is lower than a second rigidity of the shield 118 and/or battery case 120. In that case, the auxiliary crash structure 116 is configured to deform to a greater degree when impacted by the displaceable object 112 than the shield 118.

Figure 2:
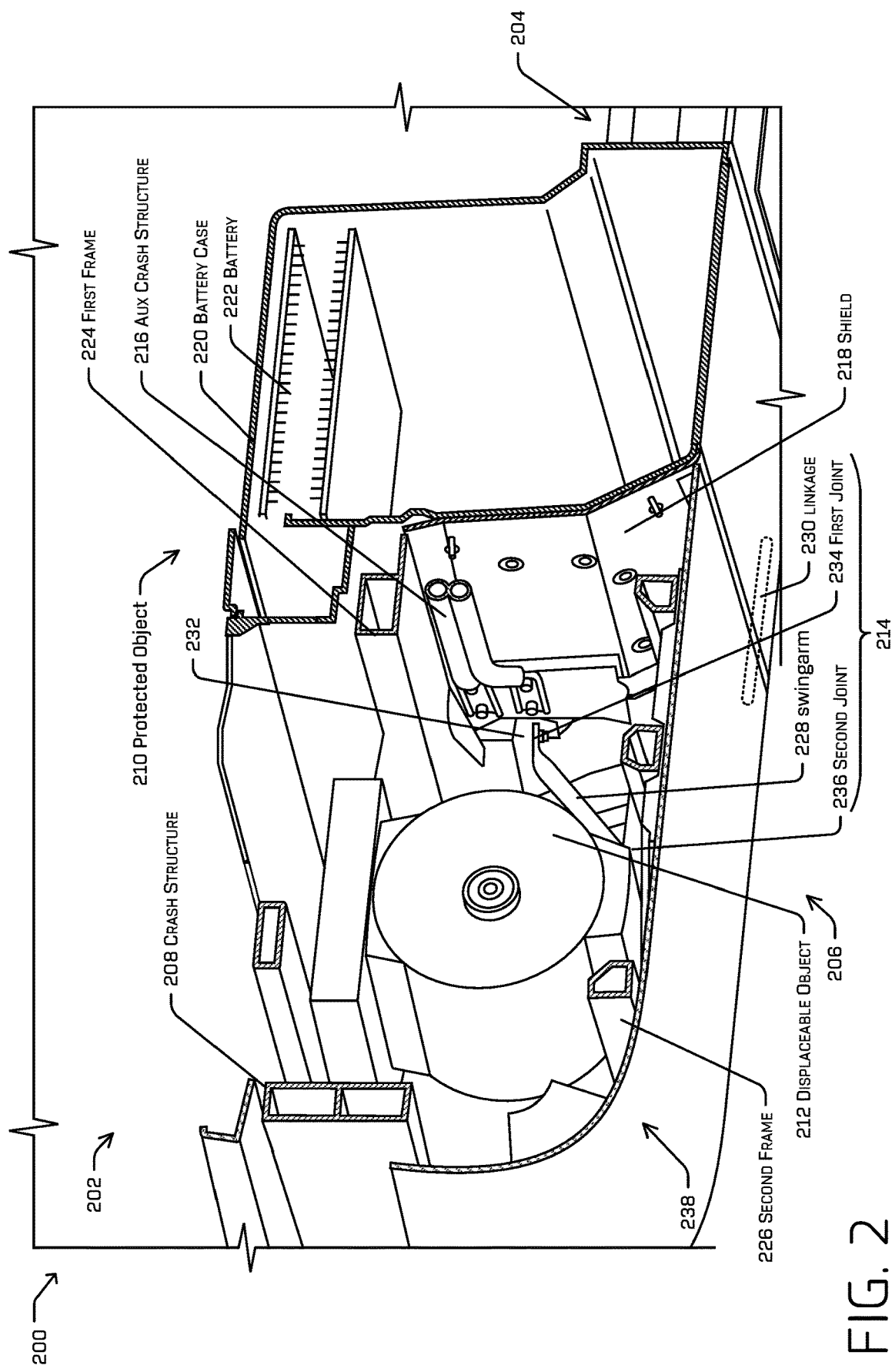
FIG. 2 is an illustration of another example vehicle having one or more drive assemblies configured with impact energy management structures to protect objects within the autonomous vehicle, in accordance with examples of the disclosure.

FIG. 2 is an illustration of another example vehicle 200 having one or more drive assemblies configured with impact energy management structures to protect objects within the vehicle 200, in accordance with examples of the disclosure.

In the illustrated example, the vehicle 200 includes a drive assembly 202 coupled to a body 204. The drive assembly 202 in this example includes multiple vehicle systems and may include other systems and structures to protect some of those systems. For example, the drive assembly 202 includes a protection system 206. The protection system 206 includes a crash structure 208, a protected object 210, a displaceable object 212, and an internal crash management system 214. In this example, the displaceable object 212 is shown as an electric motor with an inverter coupled to the top thereof. However, as discussed above, the displaceable object 212 may additionally or alternatively include other components or structures that are displaceable during a collision toward one or more protected objects.

In some examples, the internal crash management system 214 includes an auxiliary crash structure 216, for example, a cross beam/cross member, and may include a shield 218. In some examples, the shield 218 may be attached to a battery case 220 that may hold a battery 222. In some examples, the auxiliary crash structure 216 may be coupled to the battery case 220 and/or a first frame 224 or second frame 226 of the drive assembly 202 at laterally outboard edges thereof.

In some examples, the drive assembly 202 includes the first frame 224 coupled to the crash structure 208. In some examples, the first frame 224 is coupled to the protected object 210. In some examples, the first frame 224 is coupled to the internal crash management system 214. Additionally or alternatively, in some embodiments, the drive assembly 202 includes the second frame 226 coupled to the displaceable object 212.

In some examples, the internal crash management system 214 also includes a swingarm 228 and a linkage 230. In some examples, the swingarm 228 is coupled to a pocket 232 coupled to and/or created by the first frame 224 at a first joint 234. In some examples, the swingarm 228 is coupled to the second frame 226 at a second joint 236.

In some examples, the linkage 230 may be coupled to the second frame 226 at a first end of the linkage 230 and to the first frame 224 at a second end of the linkage 230. In some examples, the second end of the linkage 230 may be coupled to the first frame 224 through various members and/or components of the drive assembly 202. For example, the second end of linkage 230 may be coupled to the battery case 220 and the battery case 220 may be coupled to the first frame 224.

In some examples, the first frame 224 may be coupled to the second frame 226. For example, the first frame 224 may be coupled to the second frame 226 at the frame interface 238. The frame interface 238 may include a frangible connection. For example, the frangible connection may include fasteners that may couple the first frame 224 to the second frame 226. In some examples, the frangible connection may be broken in certain conditions. For example, an impact with an external object may cause a loading of the frame interface 238 to exceed a threshold load that may cause the frangible connection to break and/or sever.

Example Crash Energy Management Structures and Techniques

Figure 3:
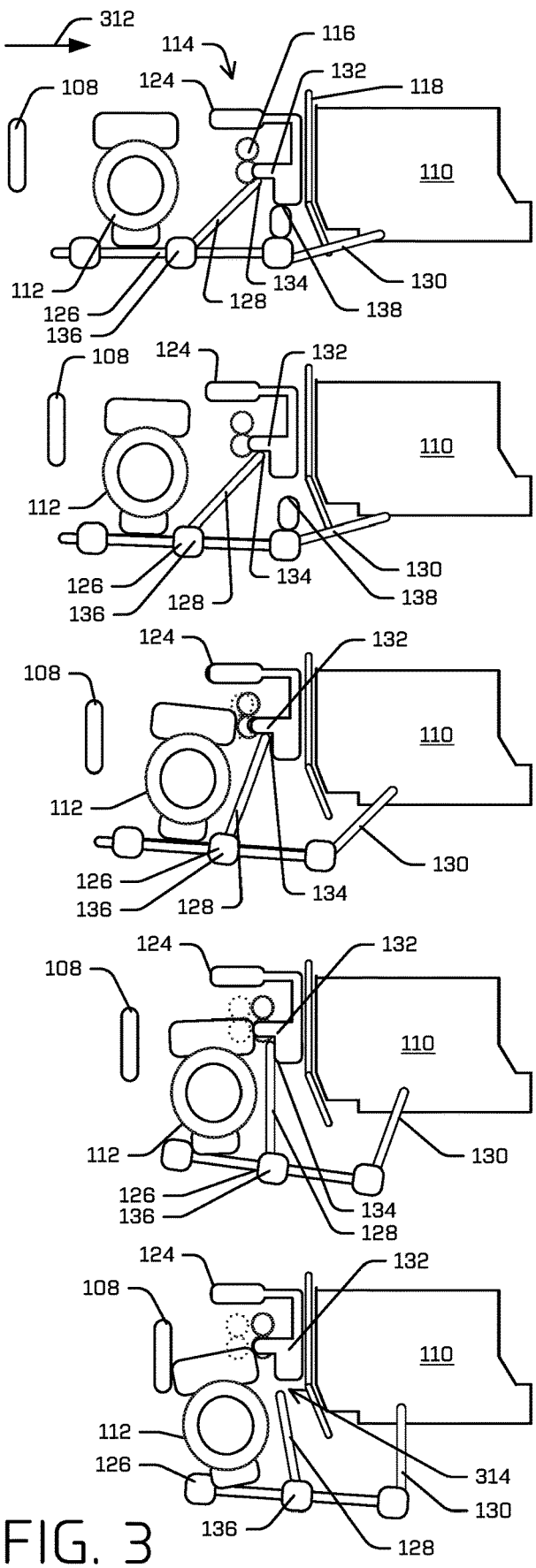
FIG. 3 is a simplified schematic illustration of a process and technique to manage energy from an impact through crash structures and energy management members in the context of the vehicle of FIG. 1.

FIG. 3 is a simplified schematic illustration of a process and technique to manage energy from an impact through a crash management system. For example, FIG. 3 shows several schematic views of drive assembly 102A of FIG. 1 as the drive assembly 102A impacts an external object and responds to the impact. For example, FIG. 3 depicts an example process 300 of mitigating an impact with an external object. At operation 302, a crash structure, for example, crash structure 108 absorbs energy from the impact. In some examples, the crash structure 108 may be displaced towards and may deform into an interior of the vehicle, for example, in the direction of arrow 312.

At operation 304, the impact may cause relative movement of the frames and/or components within the drive assembly 102A. For example, the impact may cause a second frame, for example, second frame 126 to move relative to a first frame, for example, first frame 124. In some examples, the second frame 126 may separate from the first frame 124 at a frame interface, for example, frame interface 138. In some examples, the frame interface 138 may include a frangible connection that may separate when energy from the impact exceeds a threshold level. Additionally, the impact may cause a displaceable object, for displaceable object 112, to move within the vehicle. For example, the displaceable object 112 may move towards a protected object, for example, protected object 110. If the displaceable object 112 were allowed to follow a path caused by the impact, the displaceable object 112 might impact the protected object 110 causing damage to the protected object 110. Thus, the examples described herein include coupling the displaceable object 112 to move with the second frame 126.

At operation 306, a joint may change configurations. For example, the first joint 134 may transition from a coupled or hinged joint (e.g., a living hinge), for example coupled by frangible fasteners, to a pivot joint (e.g., a ball/terminus and socket type joint), in which the end (or terminus) of the swingarm 128 formerly connected to at the pivot by frangible fasteners is decoupled from the pivot and may engage pocket 132. In some examples, pocket 132 may be coupled to the first frame 124 or created by the first frame 124. In some examples, the terminus of the swingarm 128 may be held in pocket 132 by reaction surfaces of the first frame 124 or reaction surfaces of structures coupled to the first frame 124. In some examples, the pocket 132 may be formed by reaction surfaces limiting the movement two or more directions, for example, upwards relative to the first frame 124 and in the direction of arrow 312 as shown in FIG. 3. In some examples, the pocket 132 may be formed by reaction surfaces limiting the movement three or more directions for example, upwards relative to the first frame 124, in the direction of arrow 312, and in or out of the drawing as shown in FIG. 3.

Additionally or alternatively, in some examples the swingarm 128 may be configured with other structures to form the releasable pivot joint. For example, the first joint and/or the swingarm may include a telescoping feature where a portion of the swingarm is slidably inserted into a pivot structure. In this example, a portion of the swingarm may be enclosed by a tube-like structure that may allow the swingarm to slide away from and release the tube-like structure when tension is placed on the swingarm in a direction away from the pivot joint. Additionally or alternatively, the swingarm may comprise the tube-like structure and enclose a portion of the pivot.

In other examples, the swingarm may include an open end or socket that receives a pin or rod structure to act as a pivot joint. For example, the pin or rod structure may be coupled to the first frame and the open end of the swingarm may receive the pin or rod structure. In some examples, the open end of the swingarm, when in a compression load is configured to engage the pin or rod structure and may pivot about the pin or rod structure. In some examples, the open end of the swingarm, when in a tension load is configured to disengage the pin or rod structure and allow the swingarm to move away from the pin or rod structure.

Additionally or alternatively, the second joint 136 may transition from a rigid joint, for example fixed by fasteners, to a pivot joint. For example the end of the swingarm 128 coupled to the second frame 126 may deform locally and create a living hinge.

Additionally or alternatively, the first end and the second end of linkage 130 may transition from a rigid joint, for example fixed by fasteners, to a pivot joint. For example the ends of the linkage 130 coupled to the second frame 126 and the first frame 124 may deform locally and create a living hinge.

At operation 308, the second frame 126 may be forced away from the first frame 124. For example, the second frame 126 may be movably coupled to the first frame 124 through the swingarm 128 and/or linkage 130. In some examples, the second frame 126 may move relative to the first frame 124, and in examples where the swingarm 128 and the linkage 130 form pivot joints at the respective interfaces with the first frame 124 and second frame 126, the second frame 126 may swing in a direction away from the first frame 124. FIG. 3 shows a sideview, of the management system movement of the first frame 124, second frame 126, swingarm 128, and linkage 130 may be described as substantially moving as a four-bar linkage. For example, the second frame 126 may move away from the first frame 124 as the swingarm 128 pivots relative to the first joint 134 and the second joint 136 and the linkage 130 pivots relative to the first end and second end of the linkage 130. Additionally or alternatively, in examples where the displaceable object 112 is coupled to the second frame 126, the displaceable object 112 may move with the second frame 126 away from the protected object 110.

At operation 310, the second frame 126 may continue to move away from the first frame 124. If a swingarm were to remain coupled to a first frame, the second frame may follow a substantially arced path where, the second frame would move away from the first frame initially, but begin to move towards the first frame after passing the apogee of the arced path. Thus, in examples described herein, the swingarm 128 may be released from the first joint 134, for example at location 314. In this case, the second frame 126 is not pulled back towards the first frame 124 after the swingarm 128 rotates through a release angle, for example substantially ninety degrees or vertical with respect to the drive assembly 102A. Thus, in examples where the displaceable object 112 is coupled to the second frame 126, the displaceable object 112 is not pulled back towards the protected object 110 after the swingarm 128 is released at location 314.

Example Crash Energy Management Structures

Figure 4:
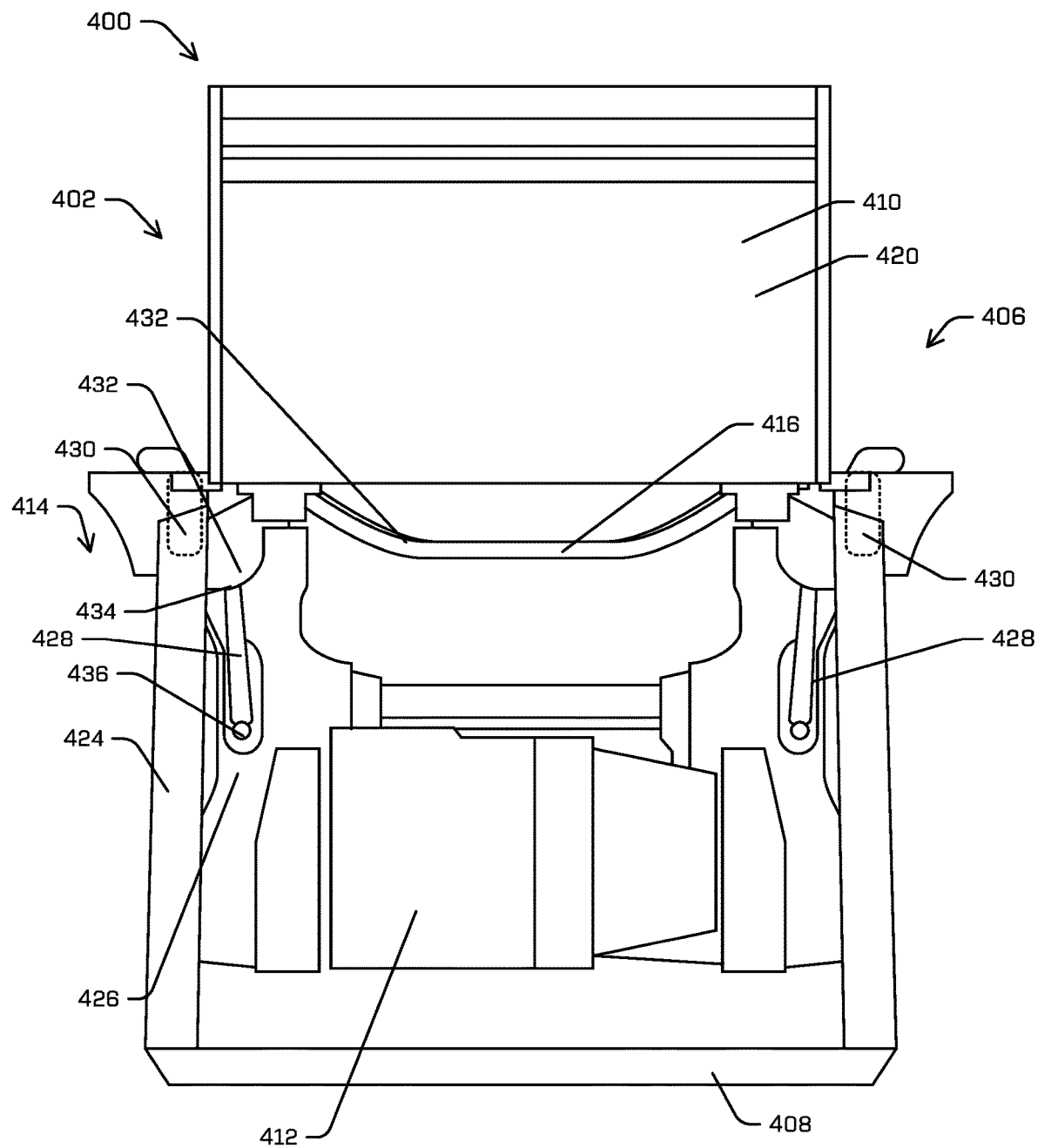
FIG. 4 a top view of an example system with impact energy management structures to protect objects within a vehicle.

FIG. 4 shows an example system 400 including impact management structures. For example, FIG. 4 shows a top down view of the system 400 having a drive assembly configured with impact energy management systems to protect objects within the vehicle, in accordance with examples of the disclosure.

In the illustrated example, the system 400 includes a drive assembly 402 coupled to a body. The drive assembly 402 in this example includes multiple vehicle systems and may include other systems and structures to protect some of those systems. For example, the drive assembly 402 includes a protection system 406. The protection system 406 includes a crash structure 408, a protected object 410, a displaceable object 412, and an internal crash management system 414. In this example, the displaceable object 412 is shown as an electric motor with an inverter coupled to the top thereof. However, as discussed above, the displaceable object 412 may additionally or alternatively include other components or structures that are displaceable during a collision toward one or more protected objects.

In some examples, the drive assembly 402 includes the first frame 424 coupled to the crash structure 408. In some examples, the first frame 424 is coupled to the protected object 410. In some examples, the first frame 424 is coupled to the internal crash management system 414. Additionally or alternatively, in some embodiments, the drive assembly 402 includes the second frame 426 coupled to the displaceable object 412.

In some examples, the internal crash management system 414 includes an auxiliary crash structure 416, for example, a cross beam/cross member, and may include a shield. In some examples, the internal crash management system 414 also includes a swingarm 428 and a linkage 430. In some examples, the swingarm 428 is coupled to a pocket 432 coupled to and/or created by the first frame 424 at a first joint 434. In some examples, the swingarm 428 is coupled to the second frame 426 at a second joint 436.

In some examples, the linkage 430 may be coupled to the second frame 426 at a first end of the linkage 430 and to the first frame 424 at a second end of the linkage 430. In some examples, the second end of the linkage 430 may be coupled to the first frame 424 through various members and/or components of the drive assembly 402. For example, the second end of linkage 430 may be coupled to the battery case 420 and the battery case 420 may be coupled to the first frame 424.

Figure 5A:
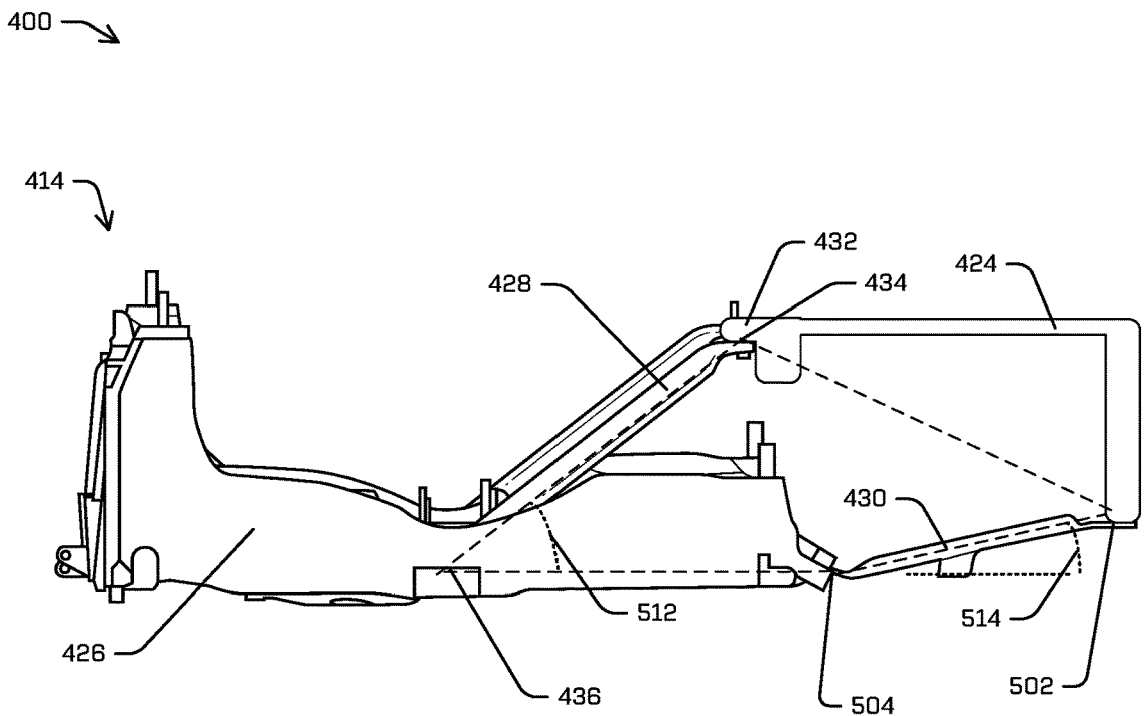
FIGS. 5A and 5B show components of an example system with impact management structures to protect objects within a vehicle.
Figure 5B:
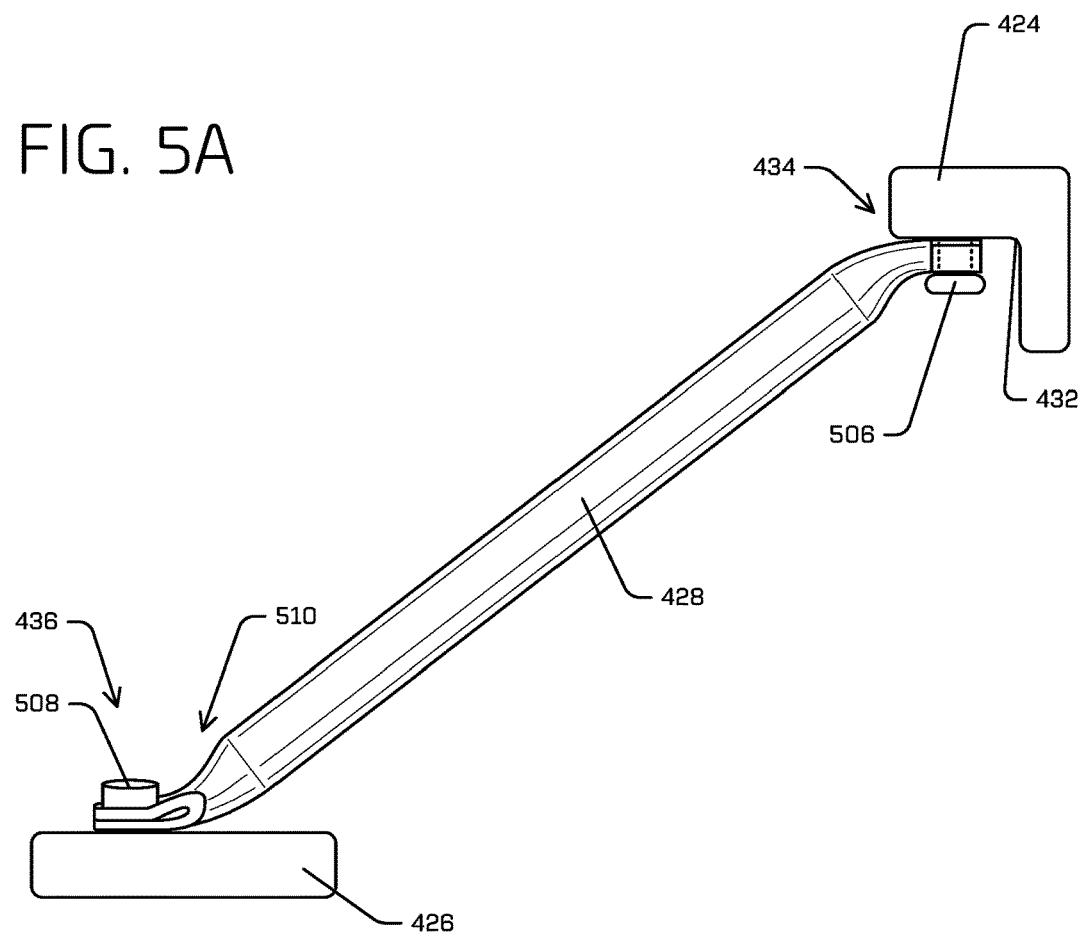

FIGS. 5A and 5B show another view of illustrative system 400. For example, FIG. 5A shows a side view of the internal crash management system 414 isolated from the drive assembly with an illustrative simplified schematic of the first frame 424 included for illustrative purposes. In this example, the first frame 424 is coupled to the internal crash management system 414. For example, the internal crash management system 414 includes a swingarm 428 and a linkage 430. In this example, the swingarm 428 is coupled to a pocket 432 coupled to and/or created by the first frame 424 at a first joint 434. In some examples, the swingarm 428 is coupled to the second frame 426 at a second joint 436.

In some examples, the linkage 430 may be coupled to the second frame 436 at a first end 502 of the linkage 430 and to the first frame 424 at a second end 504 of the linkage 430. In some examples, the second end 504 of the linkage 430 may be coupled to the first frame 424.

FIG. 5A also shows illustrative dashed lines connecting the joints between the first frame 424, the swingarm 428, the second frame 436, and the linkage 430. In this example, the first joint 434, the second joint 436, the second end 504, and the first end 502 may be described as substantially moving as a four-bar linkage. For example, the second frame 426 may move away from the first frame 424 as the swingarm 428 pivots relative to the first joint 434 and the second joint 436 and the linkage 430 pivots relative to the first end 502 and second end 504 of the linkage 430. Additionally or alternatively, in examples where the displaceable object 412 (not shown) is coupled to the second frame 426, the displaceable object 412 may move with the second frame 426 away from the protected object 410 (not shown).

FIG. 5B shows an enlarged schematic view of the swingarm 428 coupled to the first frame 424 at pocket 432 at the first joint 434. In this example, a frangible fastener 506 connects the swingarm 428 to the first frame 424.

FIG. 5B also shows the swingarm 428 coupled to the second frame 426 at the second joint 436. In this example, a fastener 508 connects the swingarm 428 to the second frame 426. Additionally or alternatively, FIG. 5B also shows a hinge region 510 of the swingarm 428. In some examples, hinge region 510 may deform, for example, plastically, during an impact. In examples, the hinge region 510 may form a living hinge that may allow swingarm 428 to pivot relative to the second frame 426 without detaching therefrom.

Additionally or alternatively, swingarm 428 may be set at an initial angle 512 from an axis of the second frame 426. For example, the axis of the second frame 426 may intersect the second joint 436 of swingarm 428 and the second end 504 of linkage 430. In some examples, initial angle 512 may be 38 degrees. In some examples, initial angle 512 may be between 30 and 50 degrees. In some examples, initial angle 512 may be based on a length, a strength, a stiffness, and/or quantity of swingarm 428. For example, the initial angle 512 may be configured to cause the second frame 426 move away from the first frame 424 before a loading experienced by the swingarm 428 causes the swingarm 428 to buckle, bend, or otherwise fail. Additionally or alternatively, the initial angle 512 may be configured to cause the second frame 426 move away from the first frame 424 before a force experienced by an occupant in a cabin to exceed a threshold.

Additionally or alternatively, in some examples, a length of the swingarm 428 may be approximately 328 mm long. In some examples, the length of the swingarm 428 may be between 300 mm and 400 mm. In some examples, the length of the swingarm 428 may be based at least in part on a size, a location, and/or a configuration of the displaceable object 412 and/or a distance to the protected object 410. In some examples, the length of the swingarm 428 may be configured to cause the second frame 426 move away from the first frame 424 before a force experienced by an occupant in a cabin to exceed a threshold.

Additionally or alternatively, linkage 430 may be set at an initial angle 514 from an axis of the second frame 426. For example, the axis of the second frame 426 may intersect the second joint 436 of swingarm 428 and the second end 504 of linkage 430. In some examples, initial angle 514 may be 12 degrees. In some examples, initial angle 514 may be between 8 and 15 degrees. In some examples, initial angle 514 may be based on a length, a strength, a stiffness, and/or quantity of linkage 430. For example, the initial angle 514 may be configured to cause the second frame 426 move away from the first frame 424 before a loading experienced by the linkage 430 causes the linkage 430 to buckle, bend, or otherwise fail. Additionally or alternatively, the initial angle 514 may be configured to cause the second frame 426 move away from the first frame 424 before a force experienced by an occupant in a cabin to exceed a threshold.

Figure 6A:
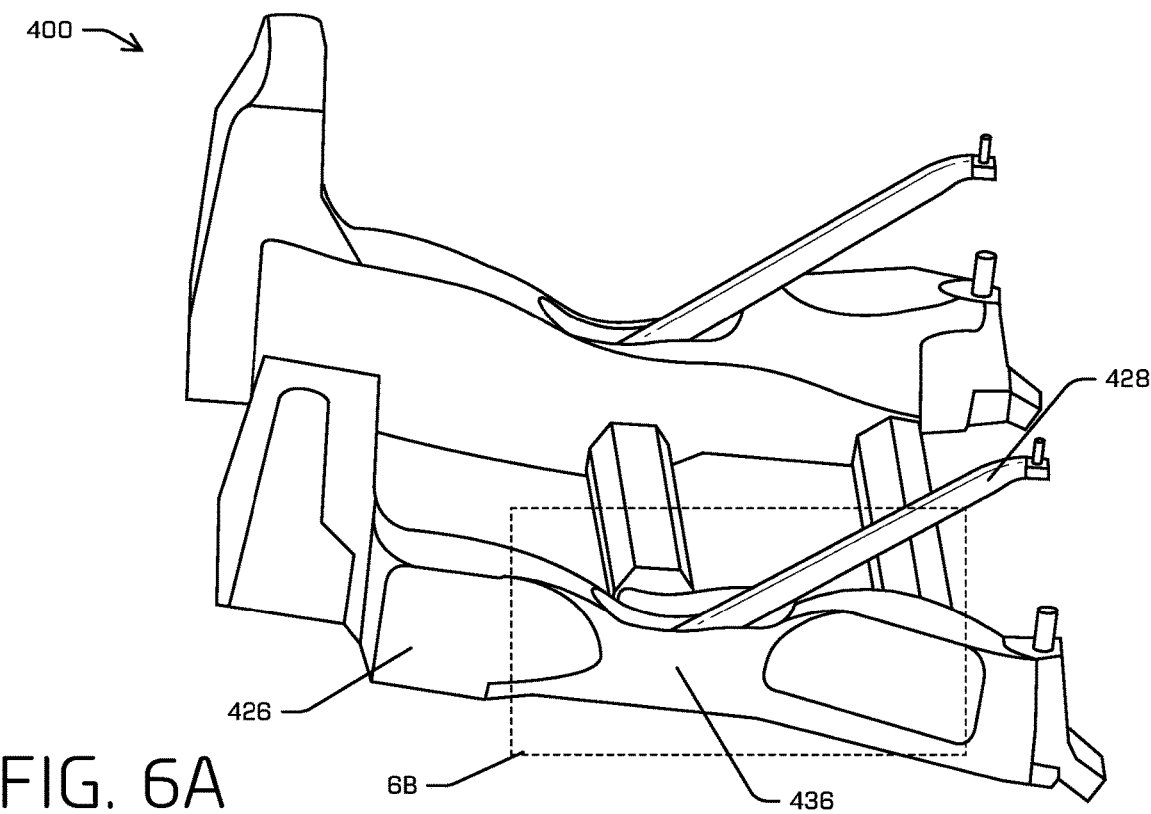
FIGS. 6A and 6B show components of an example system with impact management structures to protect objects within a vehicle.
Figure 6B:
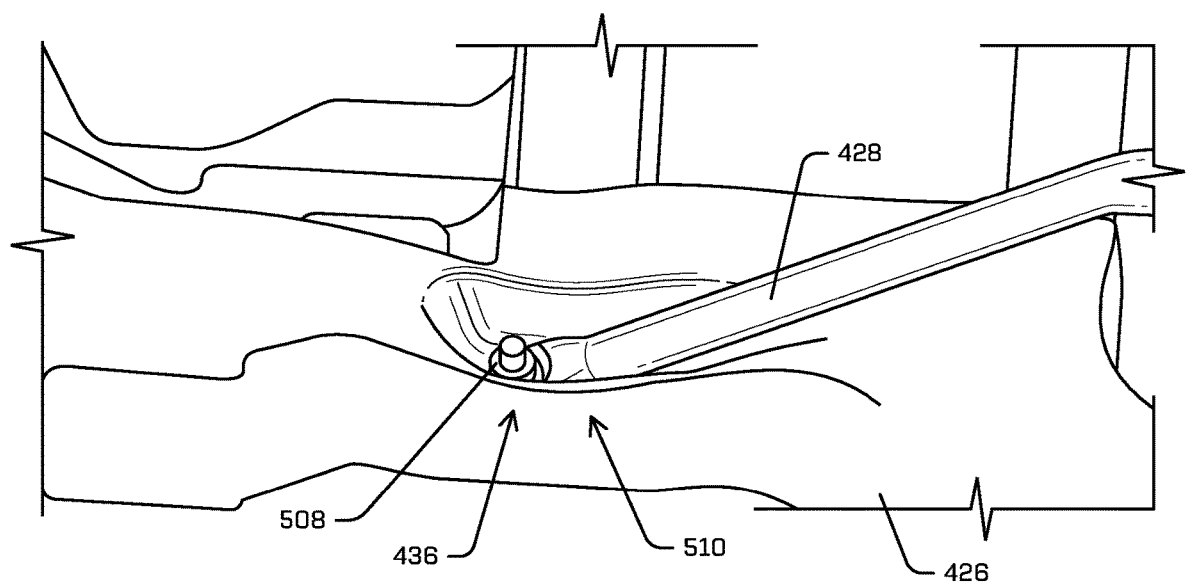

FIGS. 6A and 6B show another view of illustrative system 400. For example, FIG. 6A shows a perspective view of the internal crash management system 414 isolated from the drive assembly. In this example, the swingarm 428 is coupled to the second frame 426 at the second joint 436. FIG. 6B shows an enlarged and rotated view of portion 6B of FIG. 6A. In this example, the swingarm 428 is coupled to the second frame 426 at the second joint 436 with fastener 508. Additionally or alternatively, hinge region 510 is also shown.

Figure 7:
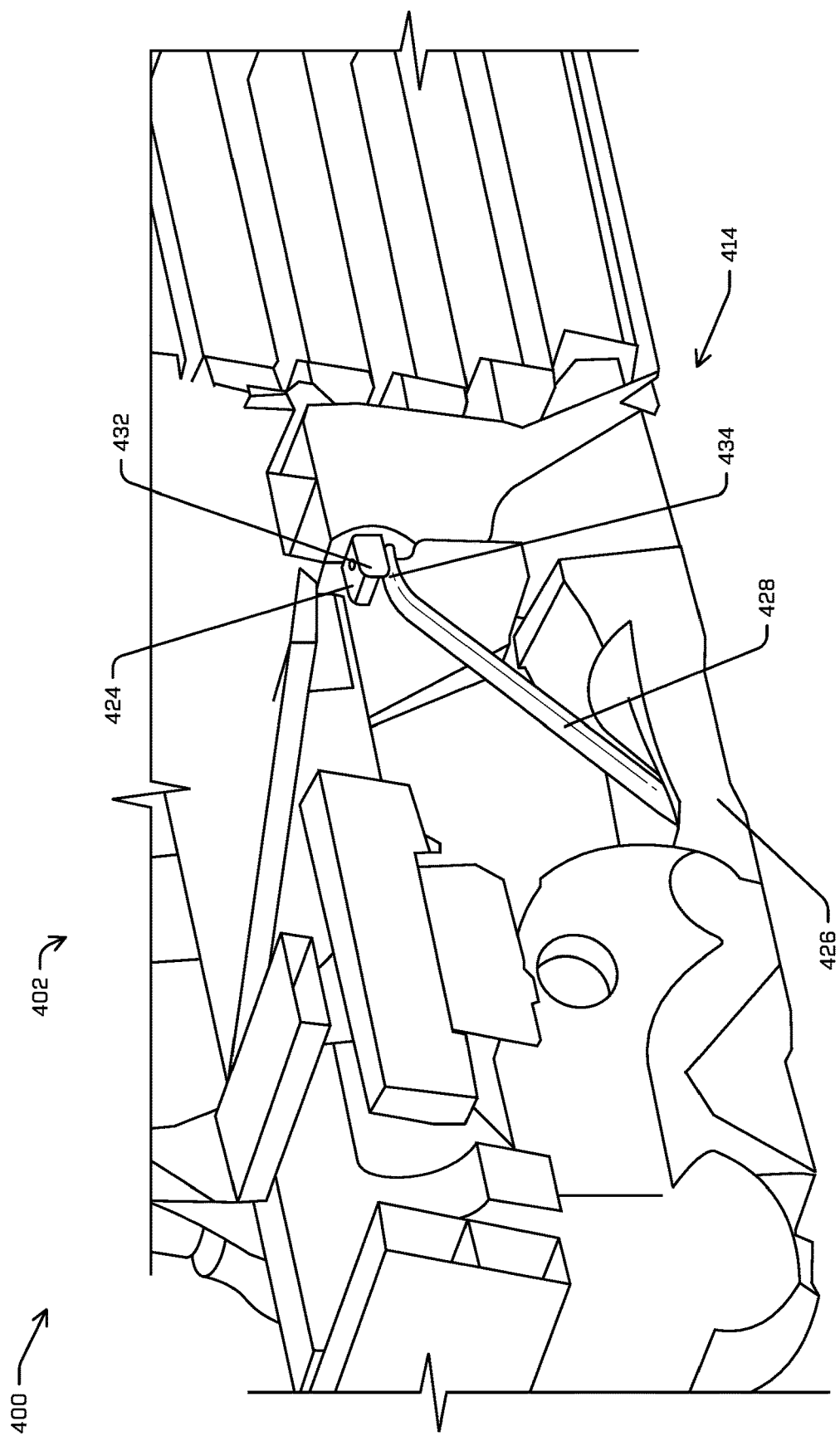
FIG. 7 shows a cutaway view of an example system with impact energy management structures to protect objects within a vehicle.

FIG. 7 shows another view of illustrative system 400. For example, FIG. 7 shows a perspective cutaway view of the internal crash management system 414 installed in the drive assembly 402. In this example, the swingarm 428 is coupled to the first frame 424 at the first joint 434. In this example, the first joint includes the pocket 432 coupled to the first frame 424.

Figure 8:
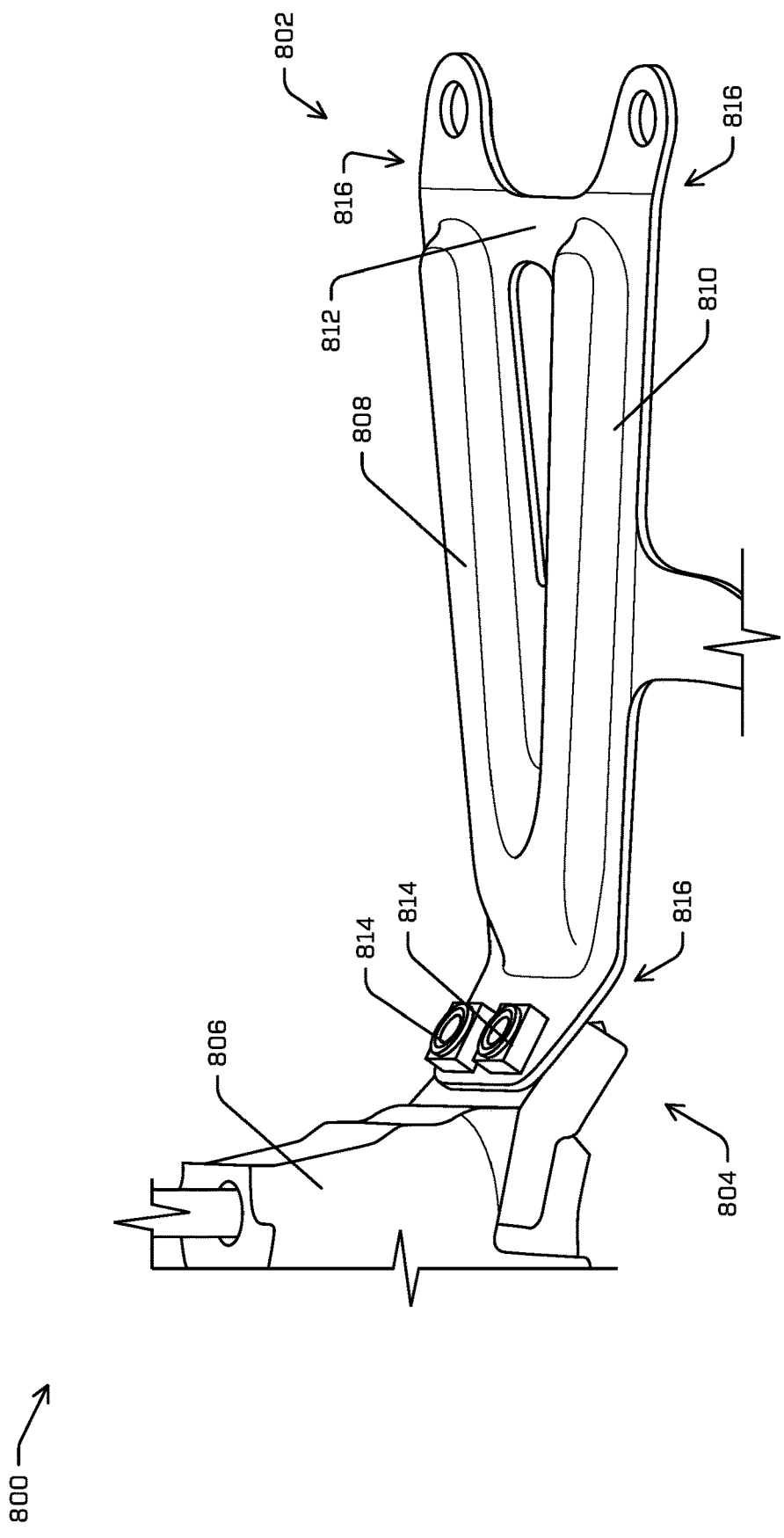
FIG. 8 shows an example component of an example system with impact management structures to protect objects within a vehicle.

FIG. 8 shows an illustrative linkage 800. In some examples, linkage 800 includes a first end 802 and a second end 804. The first end 802 may be coupled to a first frame (not shown) of a vehicle (not show) similar to the discussion above with reference to FIG. 4. The second end 804 of linkage 800 may be coupled to a second frame 806.

In some examples, the linkage 800 may have a first branch 808 and a second branch 810 that extend from the second end 804 towards the first end 802. In some examples, the first branch 808 and the second branch 810 may rejoin at the first end 802 by bridge 812. In some examples, the first branch 808, second branch 810, and bridge 812 may form an acute triangle. In some examples, the first branch 808 and/or the second branch 810 may formed using certain techniques and or materials to withstand a loading along a longitudinal axis of the linkage 800. For example, the loading may be a compressive loading condition along the longitudinal axis applied at the first end 802 and second end 804. In this example, the linkage 800 may be configured to withstand the compressive load without buckling and/or failing along the longitudinal axis.

Additionally or alternatively, the second end 804 may be coupled to the second frame 806 with fasteners 814. In some examples, the first end 802 may be coupled to a first frame (not shown) with fasteners (not shown). In some examples, the fasteners coupling the first end 802 with the first frame may be the same as or similar to fasteners 814. In some examples, linkage 800 includes a hinge region 816. In some examples, hinge region 816 may deform, for example, plastically, during an impact. In examples, the hinge region 816 may form a living hinge that may allow linkage 800 to pivot relative to the second frame 806 and the first frame without detaching therefrom.

Additional Example Crash Management Structures and Techniques

Figure 9A:
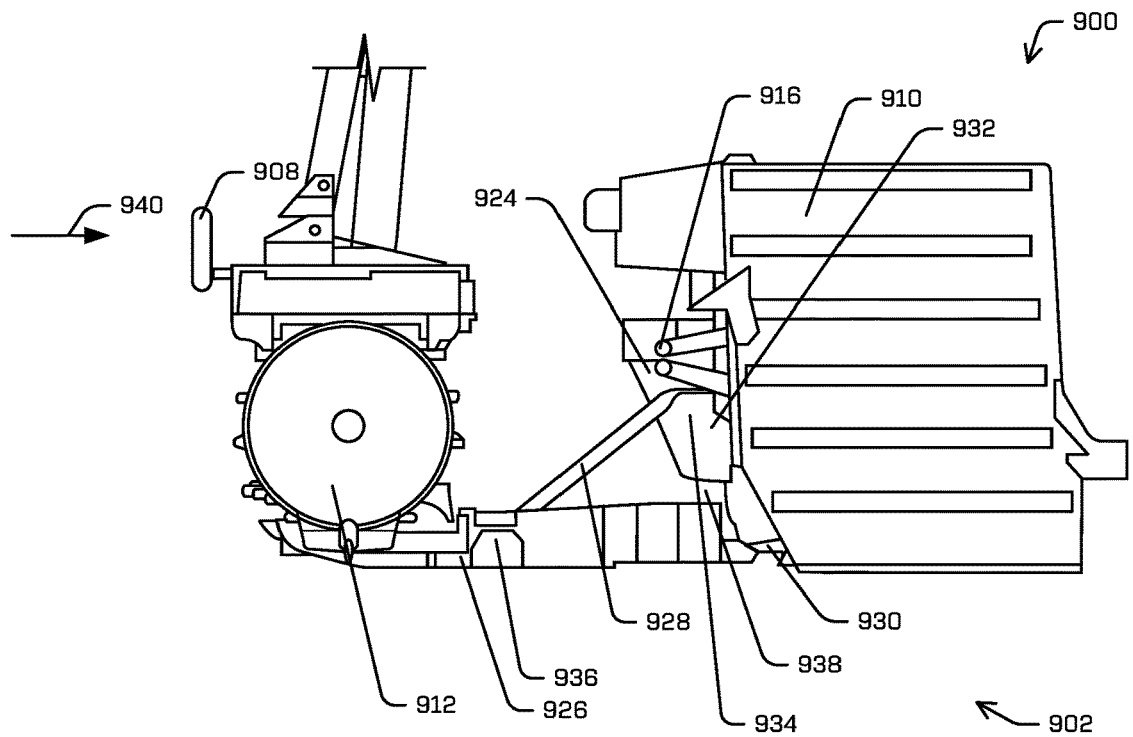
FIGS. 9A-9E is an illustration of a process and technique to manage energy from an impact through crash structures and energy management members in a vehicle.

FIGS. 9A-9E are a simplified illustration of a process and technique to manage energy from an impact through a crash management system 900. For example, FIG. 9A shows a view of drive assembly 902 as the drive assembly 902 impacts an external object and responds to the impact. For example, FIG. 9A depicts an example process of mitigating an impact with an external object. FIG. 9A shows a crash structure, for example, crash structure 908 absorbing energy from the impact. In some examples, the crash structure 908 may be displaced towards and may deform into an interior of the vehicle, for example, in the direction of arrow 940. In some examples, the drive assembly 902 may also include an auxiliary crash structure 916.

Figure 9B:
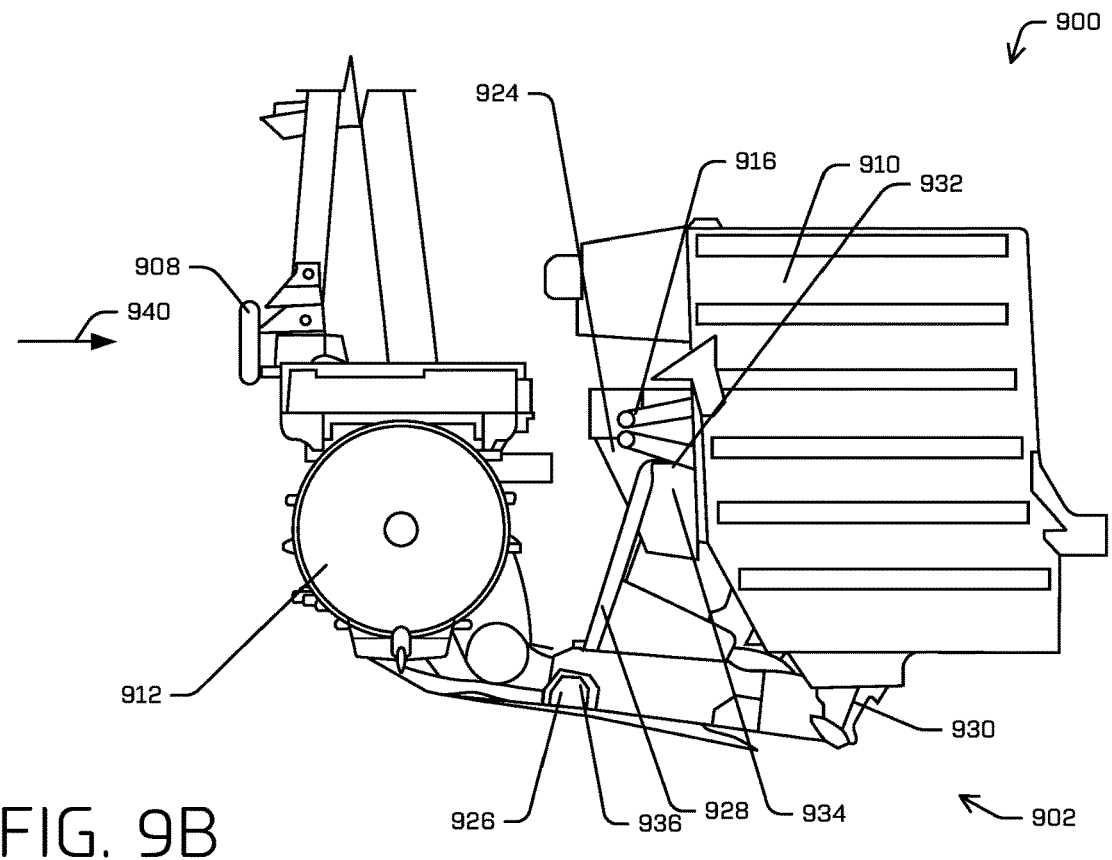

FIG. 9B, shows the impact causing relative movement of the frames and/or components within the drive assembly 902. For example, the impact may cause a second frame 926 to move relative to a first frame 924. In some examples, the second frame 926 may separate from the first frame 924 at a frame interface, for example, frame interface 938. In some examples, the frame interface 938 may include a frangible connection that may separate when energy from the impact exceeds a threshold level. Additionally, the impact may cause a displaceable object 912, to move within the vehicle. For example, the displaceable object 912 may move towards a protected object 910. If the displaceable object 912 were allowed to follow a path caused by the impact, the displaceable object 912 might impact the protected object 910 causing damage to the protected object 910. Thus, the examples described herein include coupling the displaceable object 912 to and move with the second frame 926.

Figure 9C:
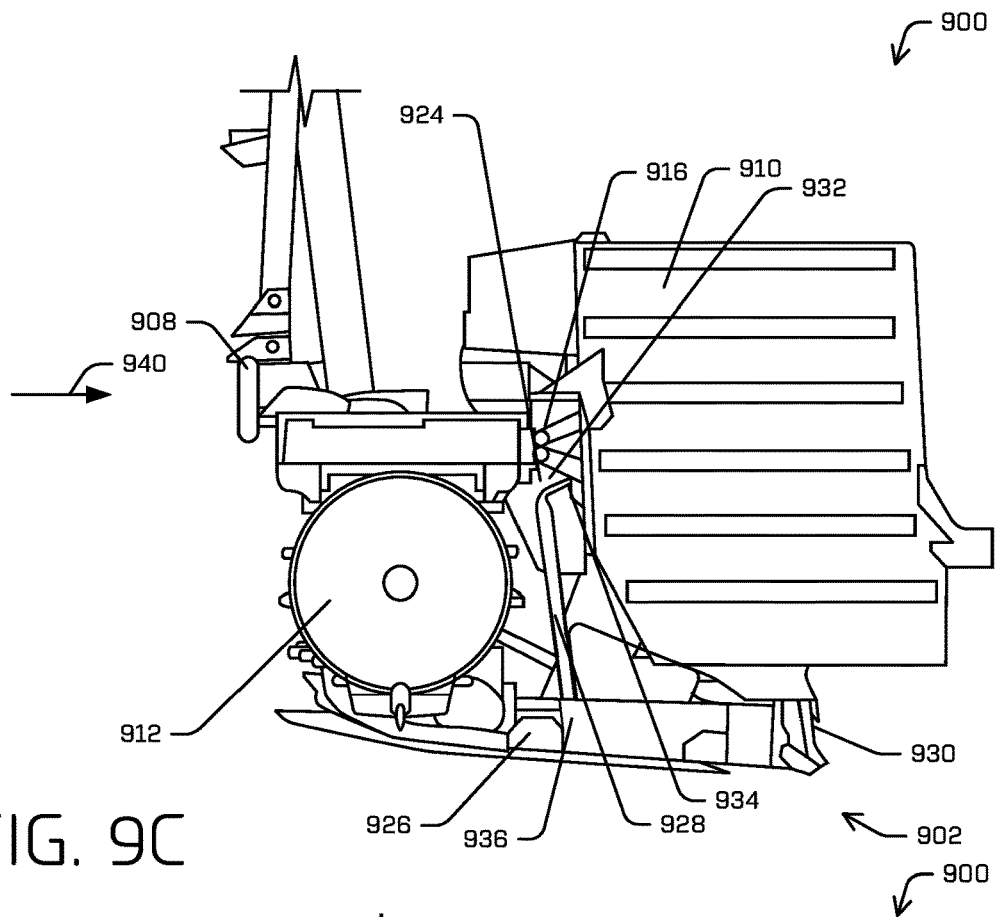

FIG. 9C, shows a joint changing configuration. For example, the first joint 934 may transition from a rigid joint, for example fixed by frangible fasteners, to a pivot joint, for example the end of the swingarm 928 formerly connected by frangible fasteners may engage pocket 932. In some examples, pocket 932 may be coupled to the first frame 924 or created by the first frame 924. In some examples, pocket 932 may be formed by reaction surfaces of the first frame 924 or reaction surfaces of structures coupled to the first frame 924. In some examples, the pocket 932 may be formed by reaction surfaces limiting the movement two or more directions, for example, upwards relative to the first frame 924 and in the direction of arrow 940. In some examples, the pocket 932 may be formed by reaction surfaces limiting the movement three or more directions for example, upwards relative to the first frame 924, in the direction of arrow 940, and in or out of the drawing as shown in FIG. 9C.

Additionally or alternatively, the second joint 936 may transition from a rigid joint, for example fixed by fasteners, to a pivot joint. For example the end of the swingarm 928 coupled to the second frame 926 may deform locally and create a living hinge.

Additionally or alternatively, the first end and the second end of linkage 930 may transition from a rigid joint, for example fixed by fasteners, to a pivot joint. For example the ends of the linkage 930 coupled to the second frame 926 and the first frame 924 may deform locally and create a living hinge.

Figure 9D:
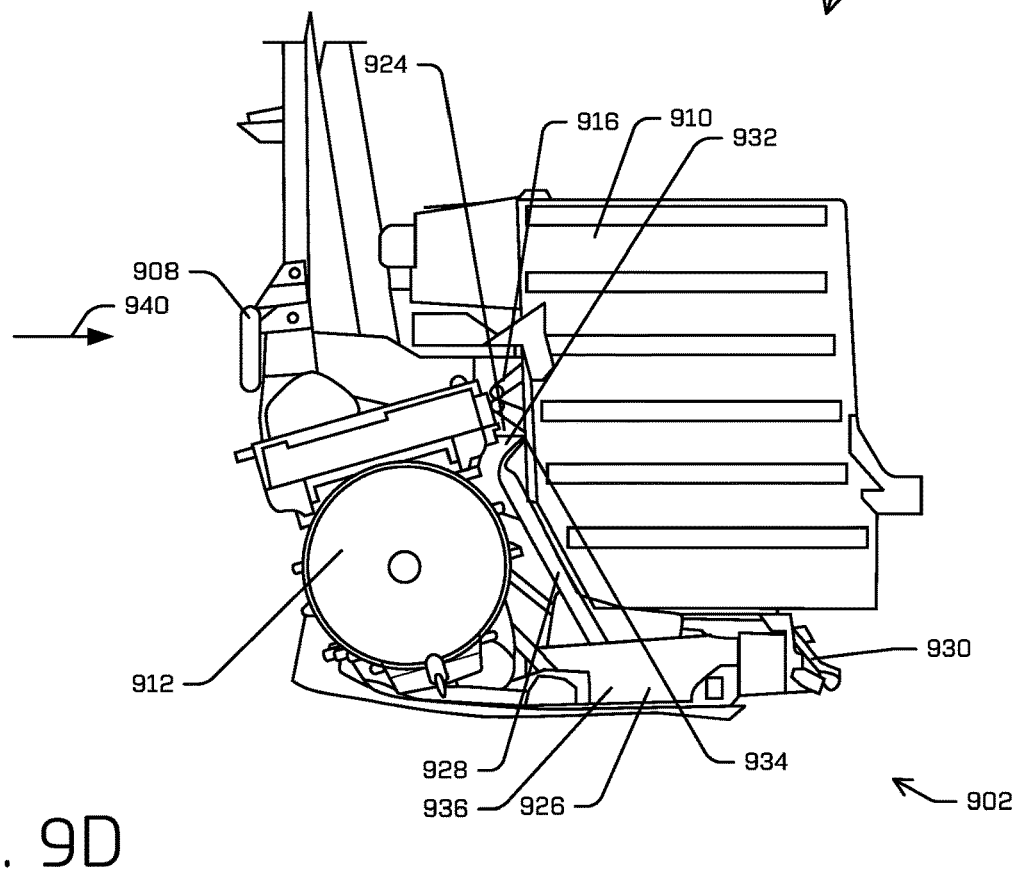

FIG. 9D, shows the second frame 926 being forced away from the first frame 924. For example, the second frame 926 may be movably coupled to the first frame 924 through the swingarm 928 and/or linkage 930. In some examples, the second frame 926 may move relative to the first frame 924, and in examples where the swingarm 928 and the linkage 930 form pivot joints at the respective interfaces with the first frame 924 and second frame 926, the second frame 926 may swing in a direction away from the first frame 924. FIG. 9D shows a cutaway sideview, of the management system movement of the first frame 924, second frame 926, swingarm 928, and linkage 930 may be described as substantially moving as a four-bar linkage. For example, the second frame 926 may move away from the first frame 924 as the swingarm 928 pivots relative to the first joint 934 and the second joint 936 and the linkage 930 pivots relative to the first end and second end of the linkage 930. Additionally or alternatively, in examples where the displaceable object 912 is coupled to the second frame 926, the displaceable object 912 may move with the second frame 926 away from the protected object 910.

Figure 9E:
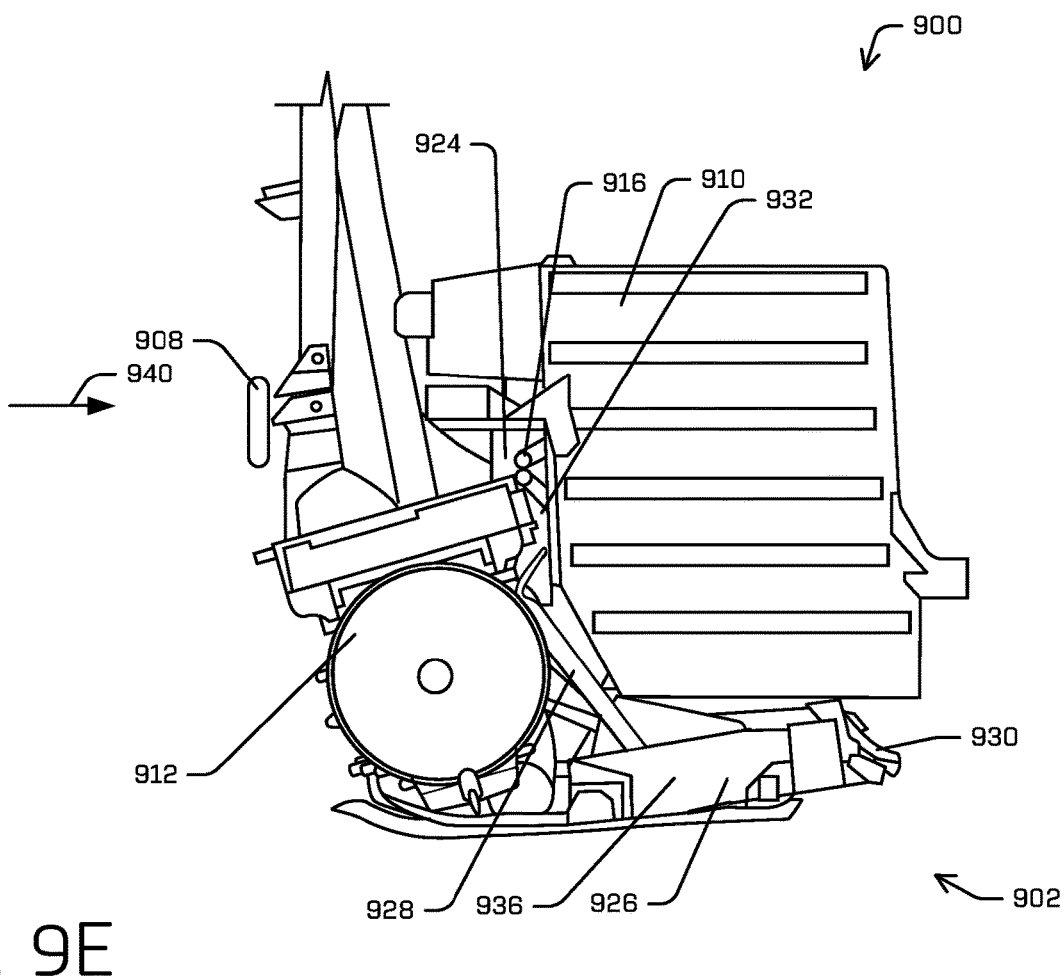

FIG. 9E, shows the second frame 926 continuing to move away from the first frame 924. If a swingarm were to remain coupled to a first frame, the second frame may follow a substantially arced path where, the second frame would move away from the first frame initially but begin to move towards the first frame after passing the apogee of the arced path. Thus, in examples described herein, the swingarm 928 may be released from the first joint 934, for example from pocket 932. In this case, the second frame 926 is not pulled back towards the first frame 924 after the swingarm 928 rotates through a release angle, for example substantially ninety degrees or vertical with respect to the drive assembly 902. Thus, in examples where the displaceable object 912 is coupled to the second frame 926, the displaceable object 912 is not pulled back towards the protected object 910 after the swingarm 928 is released from pocket 932.

Example Clauses

Any of the example clauses in this section may be used with any other of the example clauses and/or any of the other examples or embodiments described herein.

A: A vehicle comprising: an impact energy absorbing structure disposed at a distal end of the vehicle and configured to absorb energy from an impact with an external object during a collision; a first frame coupled to the impact energy absorbing structure; a second frame disposed below and spaced from the first frame by a distance; a first swingarm having a first end coupled to the first frame at a first joint and a second end coupled to the second frame at a second joint; and a second swingarm having a first end coupled to the first frame at a third joint and a second end coupled to the second frame at a fourth joint, wherein the first swingarm and the second swingarm are longer than the distance between the first frame and the second frame such that, during the collision, the first swingarm and the second swingarm are configured to direct the second frame away from the first frame and to avoid contact with the protected object during the collision.

B: The vehicle of paragraph A, wherein the first joint and the third joint are configured to disconnect at least a portion of the first swingarm and the second swingarm from the first frame in response to the collision exceeding a threshold force.

C: The vehicle of paragraphs A or B, further comprising a fifth joint and a sixth joint, the fifth joint comprising a first frangible fastener coupling the first frame to the second frame, the sixth joint comprising a second frangible fastener coupling the first frame to the second frame, the fifth joint spaced from the sixth joint, the first frangible fastener and the second frangible fastener configured to break to disconnect the first frame from the second frame at the fifth joint and the sixth joint based at least in part on the collision exceeding a threshold force.

D: The vehicle of any one of paragraphs A-C, further comprising a drive assembly, coupled to a longitudinal end of the vehicle, wherein the drive assembly includes the impact energy absorbing structure, the first frame, the second frame, the first swingarm, and the second swingarm.

E: The vehicle of any one of paragraphs A-D, wherein the drive assembly is a first drive assembly and is coupled to a first longitudinal end of the vehicle, the vehicle further comprising a second drive assembly coupled to a second longitudinal end of the vehicle opposite the first longitudinal end, the second drive assembly comprising: a second impact energy absorbing structure disposed at a second distal end of the vehicle; a third frame coupled to the impact energy absorbing structure; a fourth frame disposed below the third frame; and a third swingarm having a first end coupled to the third frame and a second end coupled to the fourth frame; and a fourth swingarm having a first end coupled to the third frame and a second end coupled to the fourth frame, wherein the third swingarm and the fourth swingarm are longer than the distance between the third frame and the fourth frame.

F: The vehicle of any one of paragraphs A-E, wherein: the first joint comprises a first frangible fastener connecting the first end of the first swingarm to the first frame; and the third joint comprises a second frangible fastener connecting the first end of the second swingarm to the first frame, wherein the first frangible fastener and second frangible fastener are configured to break when subjected to a force exceeding a threshold force to disconnect the first swingarm and the second swingarm from the first frame during the collision.

G: The vehicle of any one of paragraphs A-F, wherein: the first joint comprises a first pocket in the first frame to receive the first end of the first swingarm; and the second joint comprises a second pocket in the first frame to receive the first end of the second swingarm.

H: The vehicle of any one of paragraphs A-G, further comprising: a displaceable object coupled to the second frame, wherein the protected object is coupled to the first frame, and wherein the first swingarm and the second swingarm are configured to direct the displaceable object to avoid contact with the protected object during the collision.

I: The vehicle of any one of paragraphs A-H, wherein during the collision the first swingarm and the second swingarm are configured to pivot about the first joint and the third joint, respectively, from: a first position in which the first swingarm and the second swingarm are connected to the first frame by the first joint and the third joint; and a second position in which the first swingarm and the second swingarm are disconnected from the first frame and the first joint and the third joint function as reaction surfaces.

J: The vehicle of any one of paragraphs A-I, further comprising: a first linkage comprising: a first linkage end coupled to a proximal end of the second frame; and a second linkage end coupled to the first frame; and a second linkage comprising: a third linkage end coupled to the proximal end of the second frame spaced from the first linkage; and a fourth linkage end coupled to the first frame, wherein the first linkage and the second linkage are configured to direct the proximal end of the second frame away from the first frame and the protected object during the collision.

K: A drive assembly comprising: a first frame coupled to an impact energy absorbing structure; a second frame spaced from the first frame by a distance; a first member having a first end coupled to the first frame at a first joint and a second end coupled to the second frame at a second joint; and a second member having a first end coupled to the first frame at a third joint and a second end coupled to the second frame at a fourth joint, wherein the first member and the second member are dimensioned such that, during a collision, the first member and the second member are configured to direct the second frame away from the first frame.

L: The drive assembly of paragraph K, wherein the first joint and the third joint are configured to disconnect from the first frame in response to the collision exceeding a threshold force.

M: The drive assembly of paragraphs K or L, further comprising a fifth joint and a sixth joint, the fifth joint comprising a first frangible fastener coupling the first frame to the second frame, the sixth joint comprising a second frangible fastener coupling the first frame to the second frame, the fifth joint spaced from the sixth joint, the first frangible fastener and the second frangible fastener configured to break to disconnect the first frame from the second frame at the fifth joint and the sixth joint based at least in part on the collision exceeding a threshold force.

N: The drive assembly of any one of paragraphs K-M, wherein: the first joint comprises a first frangible fastener connecting the first end of the first member to the first frame; and the third joint comprises a second frangible fastener connecting the first end of the second member to the first frame, wherein the first frangible fastener and second frangible fastener are configured to break when subjected to a force exceeding a threshold force to disconnect the first member and the second member from the first frame during the collision.

O: The drive assembly of any one of paragraphs K-N, wherein: the first joint comprises a first pocket in the first frame to receive the first end of the first member; and the second joint comprises a second pocket in the first frame to receive the first end of the second member.

P: The drive assembly of any one of paragraphs K-O, further comprising: a protected object coupled to the first frame; and a displaceable object coupled to the second frame, wherein the first member and the second member are configured to direct the displaceable object away from contact with the protected object during the collision.

Q: The drive assembly of any one of paragraphs K-P, wherein during the collision the first member and the second member are configured to pivot about the first joint and the third joint, respectively, from: a first position in which the first member and the second member are connected to the first frame; and a second position in which the first member and the second member are disconnected from the first frame.

R: The drive assembly of any one of paragraphs K-Q, further comprising: a first linkage comprising: a first linkage end coupled to a proximal end of the second frame; and a second linkage end coupled to the first frame; and a second linkage comprising: a third linkage end coupled to the proximal end of the second frame spaced from the first linkage; and a fourth linkage end coupled to the first frame, wherein the first linkage and the second linkage are configured to direct the proximal end of the second frame away from the first frame during the collision.

S: A system comprising: a first frame; a second frame spaced from the first frame by a distance; a first member having a first end coupled to the first frame at a first joint and a second end coupled to the second frame at a second joint; and a second member having a first end coupled to the first frame at a third joint and a second end coupled to the second frame at a fourth joint, wherein the first member and the second member are the first member and the second member are longer than the distance such that, during a collision, the first member and the second member are configured to direct the second frame away from the first frame to avoid the second frame contacting a protected object during the collision.

T: The system of paragraph S, wherein: the first member comprises a first living hinge proximate the second joint; and the second member comprises a second living hinge proximate the fourth joint, wherein, during collision, the first living hinge and the second living hinge enable rotation about the second joint and the fourth joint.

While the example clauses described above are described with respect to one particular implementation, it should be understood that, in the context of this document, the content of the example clauses may also be implemented via a method, device, system, a computer-readable medium, and/or another implementation.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
   an impact energy absorbing structure disposed at a distal end of the vehicle and configured to absorb energy from an impact with an external object during a collision;
   a first frame coupled to the impact energy absorbing structure;
   a second frame disposed below and spaced from the first frame by a distance;
   a first swingarm having a first end coupled to the first frame at a first joint and a second end coupled to the second frame at a second joint; and
   a second swingarm having a first end coupled to the first frame at a third joint and a second end coupled to the second frame at a fourth joint,
   wherein the first swingarm and the second swingarm are longer than the distance between the first frame and the second frame such that, during the collision, the first swingarm and the second swingarm are configured to direct the second frame away from the first frame and to avoid contact with the protected object during the collision.

2. The vehicle of claim 1, wherein the first joint and the third joint are configured to disconnect at least a portion of the first swingarm and the second swingarm from the first frame in response to the collision exceeding a threshold force.

3. The vehicle of claim 1, further comprising a fifth joint and a sixth joint, the fifth joint comprising a first frangible fastener coupling the first frame to the second frame, the sixth joint comprising a second frangible fastener coupling the first frame to the second frame, the fifth joint spaced from the sixth joint, the first frangible fastener and the second frangible fastener configured to break to disconnect the first frame from the second frame at the fifth joint and the sixth joint based at least in part on the collision exceeding a threshold force.

4. The vehicle of claim 1, further comprising a drive assembly, coupled to a longitudinal end of the vehicle, wherein the drive assembly includes the impact energy absorbing structure, the first frame, the second frame, the first swingarm, and the second swingarm.

5. The vehicle of claim 4, wherein the drive assembly is a first drive assembly and is coupled to a first longitudinal end of the vehicle, the vehicle further comprising a second drive assembly coupled to a second longitudinal end of the vehicle opposite the first longitudinal end, the second drive assembly comprising:
   a second impact energy absorbing structure disposed at a second distal end of the vehicle;
   a third frame coupled to the impact energy absorbing structure;
   a fourth frame disposed below the third frame; and
   a third swingarm having a first end coupled to the third frame and a second end coupled to the fourth frame; and
   a fourth swingarm having a first end coupled to the third frame and a second end coupled to the fourth frame,
   wherein the third swingarm and the fourth swingarm are longer than the distance between the third frame and the fourth frame.

6. The vehicle of claim 1, wherein:
   the first joint comprises a first frangible fastener connecting the first end of the first swingarm to the first frame; and
   the third joint comprises a second frangible fastener connecting the first end of the second swingarm to the first frame,
   wherein the first frangible fastener and second frangible fastener are configured to break when subjected to a force exceeding a threshold force to disconnect the first swingarm and the second swingarm from the first frame during the collision.

7. The vehicle of claim 1, wherein:
   the first joint comprises a first pocket in the first frame to receive the first end of the first swingarm; and
   the second joint comprises a second pocket in the first frame to receive the first end of the second swingarm.

8. The vehicle of claim 1, further comprising:
   a displaceable object coupled to the second frame,
   wherein the protected object is coupled to the first frame, and
   wherein the first swingarm and the second swingarm are configured to direct the displaceable object to avoid contact with the protected object during the collision.

9. The vehicle of claim 1, wherein during the collision the first swingarm and the second swingarm are configured to pivot about the first joint and the third joint, respectively, from:
   a first position in which the first swingarm and the second swingarm are connected to the first frame by the first joint and the third joint; and
   a second position in which the first swingarm and the second swingarm are disconnected from the first frame and the first joint and the third joint function as reaction surfaces.

10. The vehicle of claim 1, further comprising:
    a first linkage comprising:
       a first linkage end coupled to a proximal end of the second frame; and
       a second linkage end coupled to the first frame; and
    a second linkage comprising:
       a third linkage end coupled to the proximal end of the second frame spaced from the first linkage; and
       a fourth linkage end coupled to the first frame,
    wherein the first linkage and the second linkage are configured to direct the proximal end of the second frame away from the first frame and the protected object during the collision.

11. A drive assembly comprising:
    a first frame coupled to an impact energy absorbing structure;

a second frame spaced from the first frame by a distance;

a first member having a first end coupled to the first frame at a first joint and a second end coupled to the second frame at a second joint; and a second member having a first end coupled to the first frame at a third joint and a second end coupled to the second frame at a fourth joint, wherein the first member and the second member are dimensioned such that, during a collision, the first member and the second member are configured to direct the second frame away from the first frame.

12. The drive assembly of claim 11, wherein the first joint and the third joint are configured to disconnect from the first frame in response to the collision exceeding a threshold force.

13. The drive assembly of claim 11, further comprising a fifth joint and a sixth joint, the fifth joint comprising a first frangible fastener coupling the first frame to the second frame, the sixth joint comprising a second frangible fastener coupling the first frame to the second frame, the fifth joint spaced from the sixth joint, the first frangible fastener and the second frangible fastener configured to break to disconnect the first frame from the second frame at the fifth joint and the sixth joint based at least in part on the collision exceeding a threshold force.

14. The drive assembly of claim 11, wherein:

the first joint comprises a first frangible fastener connecting the first end of the first member to the first frame; and the third joint comprises a second frangible fastener connecting the first end of the second member to the first frame, wherein the first frangible fastener and second frangible fastener are configured to break when subjected to a force exceeding a threshold force to disconnect the first member and the second member from the first frame during the collision.

15. The drive assembly of claim 11, wherein:

the first joint comprises a first pocket in the first frame to receive the first end of the first member; and the second joint comprises a second pocket in the first frame to receive the first end of the second member.

16. The drive assembly of claim 11, further comprising:

a protected object coupled to the first frame; and a displaceable object coupled to the second frame, wherein the first member and the second member are configured to direct the displaceable object away from contact with the protected object during the collision.

17. The drive assembly of claim 11, wherein during the collision the first member and the second member are configured to pivot about the first joint and the third joint, respectively, from:

a first position in which the first member and the second member are connected to the first frame; and a second position in which the first member and the second member are disconnected from the first frame.

18. The drive assembly of claim 11, further comprising:

a first linkage comprising:

a first linkage end coupled to a proximal end of the second frame; and a second linkage end coupled to the first frame; and a second linkage comprising:

a third linkage end coupled to the proximal end of the second frame spaced from the first linkage; and a fourth linkage end coupled to the first frame, wherein the first linkage and the second linkage are configured to direct the proximal end of the second frame away from the first frame during the collision.

19. A system comprising:

a first frame;

a second frame spaced from the first frame by a distance;

a first member having a first end coupled to the first frame at a first joint and a second end coupled to the second frame at a second joint; and a second member having a first end coupled to the first frame at a third joint and a second end coupled to the second frame at a fourth joint, wherein the first member and the second member are the first member and the second member are longer than the distance such that, during a collision, the first member and the second member are configured to direct the second frame away from the first frame to avoid the second frame contacting a protected object during the collision.

20. The system of claim 19, wherein:

the first member comprises a first living hinge proximate the second joint; and the second member comprises a second living hinge proximate the fourth joint, wherein, during collision, the first living hinge and the second living hinge enable rotation about the second joint and the fourth joint.

* * * * *